United States Patent [19]

Nishikawa et al.

[11] Patent Number: 4,655,330

[45] Date of Patent: * Apr. 7, 1987

[54] DIRECT-COUPLING CONTROL SYSTEM FOR TORQUE CONVERTER IN AUTOMATIC TRANSMISSION FOR VEHICLES

[75] Inventors: Masao Nishikawa, Tokyo; Kouji Yamaguchi, Tokorozawa; Yoshimi Sakurai, Tanashi; Takashi Aoki, Fujimi, all of Japan

[73] Assignee: Honda Giken Kogyo Kabushiki Kaisha, Tokyo, Japan

[*] Notice: The portion of the term of this patent subsequent to Jan. 21, 2003 has been disclaimed.

[21] Appl. No.: 608,624

[22] Filed: May 9, 1984

[30] Foreign Application Priority Data

May 10, 1983 [JP] Japan .................................. 58-81180

[51] Int. Cl.$^4$ .......................................... B60K 41/22
[52] U.S. Cl. .................................. 192/3.3; 192/3.31; 192/3.33; 192/3.57
[58] Field of Search ...................... 192/3.3, 3.31, 3.29, 192/3.33, 3.57; 74/733

[56] References Cited

U.S. PATENT DOCUMENTS

| | | | |
|---|---|---|---|
| 2,758,686 | 8/1956 | Rabe | 192/3.57 |
| 2,966,972 | 1/1961 | Nallinger | 192/3.57 |
| 3,126,988 | 3/1964 | Memmer | 192/3.57 |
| 3,128,642 | 4/1964 | Fisher et al. | 192/3.57 X |
| 3,548,981 | 12/1970 | Hill et al. | 192/3.57 |
| 3,557,918 | 1/1971 | Akima | 192/3.57 |
| 3,789,963 | 2/1974 | Bailey et al. | 192/3.57 |
| 3,857,302 | 12/1974 | Morris | 192/3.3 |
| 4,428,259 | 1/1984 | Kubo et al. | 192/3.31 X |
| 4,457,413 | 7/1984 | Hattori | 192/3.31 |
| 4,462,490 | 7/1984 | Hattori | 192/3.31 X |
| 4,565,267 | 1/1986 | Nishikawa et al. | 192/3.31 |

Primary Examiner—Rodney H. Bonck
Attorney, Agent, or Firm—Armstrong, Nikaido, Marmelstein & Kubovcik

[57] ABSTRACT

A direct coupling clutch controller interposed between a direct coupling clutch in a torque converter of an automatic transmission and a hydraulic pressure source for temporarily disconnecting the direct coupling clutch whenever the transmission shifts gears. The controller is particularly suitable for transmissions having four or more gear stages, and includes a valve having a first and a second switching position where the pressure source is connected to the clutch. As the valve moves between the positions, the connection is interrupted. The valve is pilot operated by the transmission controller.

4 Claims, 9 Drawing Figures

DIRECT-COUPLING CONTROL SYSTEM FOR TORQUE CONVERTER IN AUTOMATIC TRANSMISSION FOR VEHICLES

BACKGROUND OF THE INVENTION

1. Field of the Invention:

This invention relates to a direct-coupling control system for a torque converter in an automatic transmission for vehicles and, more particularly, to improvements in a direct-coupling control system for releasing a lockup of the torque converter at a preferable timing at various gear shifting times when direct-coupling and hence locking up a torque converter over gear shifting stages of more than adjacent four speeds of an automatic transmission having not less than four forward speeds.

2. Description of the Prior Art:

In an automatic transmission provided with a torque converter, it is effective to direct-couple and hence lock up the torque converter so as to decrease the fluid slipping losses of the torque converter. It is desired to lock up from a low-speed stage to increase the efficency as much as possible. To this end, there has been proposed by the inventors of the present invention, a system capable of releasing the lockup of a torque converter by a sole switching valve at various gear shifting times when locking up the torque converter over not less than three adjacent speeds. However, in order to attempt to lock up the torque converter over first to fourth speeds by applying this system to an automatic transmission provided with four forward speeds, another switching valve is necessary, and the system has to accept a complicated and large-sized structure. The multiplication in the number of speeds in an automatic transmission is inevitable to attempt to improve the fuel consumption while maintaining the present driving performance. The transmission is developed to have the multiplication in the speeds such as four or five speeds. This multiplication means increasing the number of control valves. Therefore, since the number of the control valves for controlling the lockup of the torque converter is increased, the automatic transmission is greatly restricted in the installation space and production.

OBJECT AND SUMMARY OF THE INVENTION

The present invention has been developed in view of the above-mentioned problems. An object of the present invention is to provide a simply-constructed, effectively-operable direct-coupling control system for a torque converter in an automatic transmission for vehicles, which is capable of releasing the lockup of the torque converter at gear shifting time by a sole control valve or by the addition of extremely small number of parts when locking up the torque converter over not less than four adjacent speeds.

According to the present invention, a control means for controlling the coupled state of a direct-coupling clutch, and interposed in an oil line for connecting between a hydraulic pressure source and the direct-coupling clutch, has a valve having first and second switching positions for opening the oil line which valve temporarily closes the oil line upon moving between both switching positions in such a manner that the valve alternately switches between the first and the second switching positions whenever the gear shifts.

BRIEF DESCRIPTION OF THE DRAWINGS

The above and other objects and the attending advantages of the present invention will become readily apparent by reference to the following detailed description when considered in conjunction with the accompanying drawings wherein.

DETAILED DESCRIPTION OF PREFERRED EMBODIMENTS

The embodiments of the present invention will now be described with reference to the accompanying drawings.

Figure 1:
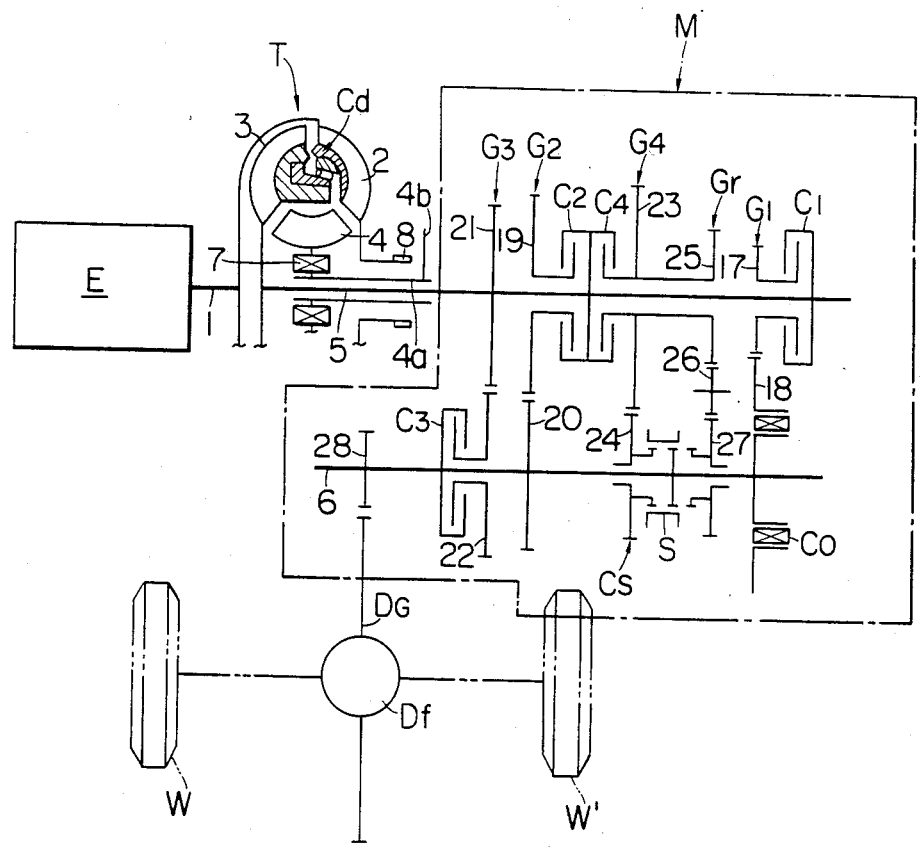
FIG. 1 is a schematic diagram of an automatic transmission for vehicles, to which a first embodiment of the present invention is applied.

FIG. 1 is a schematic view of an automatic transmission of a vehicle with four forward speeds and one reverse speed, to which the present invention is applied. As shown, the output of an engine E is transmitted from its crankshaft 1 to torque converter T, an auxiliary transmission M, and a differential mechanism Df in sequence to drive wheels W and W'.

The torque converter T is constructed of: a pump rotor 2 connected to the crankshaft 1; a turbine rotor 3 connected to an input shaft 5 of the auxiliary transmission M; and a stator 4 connected by a one-way clutch 7 to a stator shaft 4a borne rotatably on the input shaft 5. The torque transmitted from the crankshaft 1 to the pump rotor 2 is hydraulically transmitted to the turbine rotor 3 so that, if the torque is amplified in the meanwhile, its reaction is borne by the stator 4, as is well known in the art.

Figure 2:
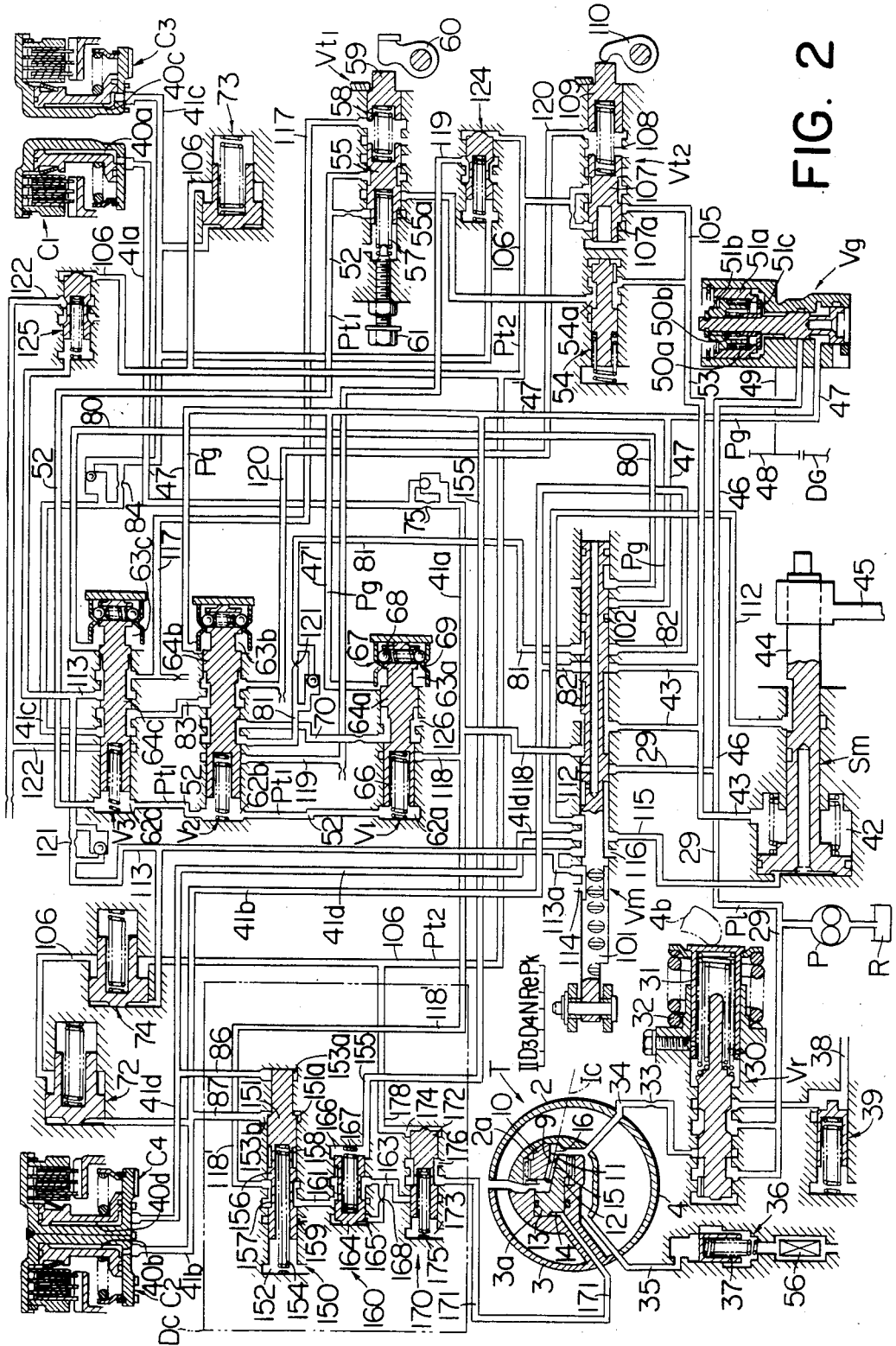
FIG. 2 is a hydraulic control circuit for the automatic transmission.

The right-hand end of the pump rotor 2 is provided with a pump drive gear 8 driving a hydraulic pump P of FIG. 2. A stator arm 4b is attached to the right-hand end of the stator shaft 4a to control a regulator valve Vr of FIG. 2.

A roller type of direct-coupling clutch Cd is interposed between the pump rotor 2 and the turbine rotor 3 so as to mechanically connect them. This can be seen in detail with reference to FIGS. 2 and 3. An annular driving member 10 which has a conical driving surface 9 around its inner periphery is splined to an inner circumferential wall 2a of the pump rotor 2. A driven member 12 which has about its outer periphery a conical driven surface 11 facing and parallel to the conical driving surface 9 is splined so as to be axially slidable to the inner circumferential wall 3a of the turbine rotor 3. A piston 13 is integrally formed at one end of the driven member 12 so as to fit slidably into a hydraulic cylinder 14 formed in the inner circumferential wall 3a of the turbine rotor 3. Its right and left end faces receive simultaneously the pressure within the cylinder 14 and the pressure within the torque converter T, respectively.

Figure 3:
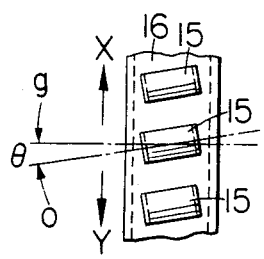
FIG. 3 is a development of a principal portion of the direct-coupling clutch shown in FIG. 2.

Cylindrical clutch rollers 15 retained by an annular retainer 16 are provided between the conical driving and driven surfaces 9 and 11, as shown in FIG. 3, in such a manner that their central axes o are inclined at a predetermined angle $\theta$ with respect to a generatrix g of an imaginary conical surface Ic (FIG. 2) extending through the center between the two conical surfaces 9 and 11.

As a result, if oil pressure higher than the pressure within the torque converter T is introduced into the hydraulic cylinder 14 at a stage at which the torque-amplifying function of the torque converter T is unnecessary, the piston 13, and hence the driven member 12, is pushed toward the driving member 10. Consequently, the clutch rollers 15 are forced into contact with the two conical surfaces 9 and 11. When, at this time, the driving member 10 is turned in the X direction of FIG. 3 relative to the driven member 12 by the output torque of the engine E, the clutch rollers 15 accordingly revolve about their axes. Since, however, the central axes o of the clutch rollers 15 are inclined as described above, their rotation imparts relative axial displacements to the two members 10 and 12 that make them approach each other. As a result, the clutch rollers 15 bite between the two conical surfaces 9 and 11 so that they mechanically couple the two members 10 and 12, and, thus, the pump rotor 2 and the turbine rotor 3. If, even with the operation of the direct-coupling clutch Cd, the output torque of the engine E applied between the two rotors 2 and 3 exceeds the resultant coupling force, the clutch rollers 15 slip relative to each of the conical surfaces 9 and 11 so that the torque is divided into two parts, one part of which is mechanically transmitted through the direct-coupling clutch Cd, whereas the other part is hydraulically transmitted through the two rotors 2 and 3 to the input shaft 5, thus forming a variable power-dividing system varying the ratio of the former torque to the latter torque according to the amount of slippage of the clutch rollers 15.

During the operation of the direct-coupling clutch Cd, if a negative load is applied to the torque converter T, the rotational speed of the driven member 12 exceeds that of the driving member 10. As a result, the driving member 10 is turned in the Y direction relative to the driven member 12, so that the clutch rollers 15 accordingly rotate about their axes in the direction opposite to the above one, to impart relative axial displacements to the two members 10 and 12 that make them separate. Consequently, the clutch rollers 15 are released from their engagement with the two conical surfaces 9 and 11, and are left idling. As a consequence, the transmission of the negative load from the turbine rotor 3 to the pump rotor 2 is conducted only in a hydraulic manner.

If the oil pressure of the hydraulic cylinder 14 is released, the piston 13 is retracted to its initial position by the pressure within the torque converter T, so that the direct-coupling clutch Cd is inoperative.

Returning to FIG. 1, a first-speed gear train G1, a second-speed gear train G2, a third-speed gear train G3, a fourth-speed gear train G4, and a reverse gear train Gr are interposed between the input and output shafts 5 and 6 of the auxiliary transmission M, which are arranged parallel with each other. The first-speed gear train is constructed of a driving gear 17 connected to the input shaft 5 by a first-speed clutch C1, and a driven gear 18 which is connected to the output shaft 6 by a one-way clutch C0 and which meshes with the driving gear 17. Similarly, the second-speed gear train G2 is constructed of a driving gear 19 connected to the input shaft 5 by a second-speed clutch C2 and a driven gear 20 which is connected to the output shaft 6 and which meshes with the driving gear 19. The third-speed gear train G3 is constructed of a driving gear 21 which is connected to the input shaft 5, and a driven gear 22 which is connected to the output shaft 6 by a third-speed clutch C3 and which meshes with the driving gear 21. The fourth-speed gear train G4 is constructed of a driving gear 23 which is connected to the input shaft 5 by a fourth-speed clutch C4, and a driven gear 24 connected to the output shaft 6 by a switching clutch Cs and which meshes with the driving gear 23. The reverse gear train Gr is constructed of a driving gear 25 made integral with the driving gear 23 of the fourth-speed gear train G4, a driven gear 27 connected to the output shaft 6 by the switching gear Cs, and an idle gear 26 meshing with the two gears 25 and 27. The switching clutch Cs is interposed between the driven gears 24 and 27 so that it is able to selectively connect either of the driven gears 24 and 27 to the output shaft 6 by the movement of a selector sleeve S of the switching clutch Cs to either a forward position at the left-hand side of the drawing or a backward position at the right-hand side of the drawing. The one-way clutch C0 transmits only the driving torque from the engine E and does not transmit the torque in the opposite direction.

If only the first-speed clutch C1 is connected while the selector sleeve S is held in the forward position, as shown, the driving gear 17 is connected to the input shaft 5 to establish the first-speed gear train G1 by which torque is transmitted from the input shaft 5 to the output shaft 6. Next, if the second-speed clutch C2 is connected while the first-speed stage clutch C1 is still applied, the driving gear 19 is connected to the input shaft 5 to establish the second-speed gear train G2 by which torque is transmitted from the input shaft 5 to the output shaft 6. While the first-speed clutch C1 is still applied, it does not become the first speed but becomes the second speed by the operation of the one-way clutch C0, and the third and fourth speeds are similarly obtained. If the second-speed clutch C2 is released and the third-speed clutch C3 is applied, the driven gear 22 is connected to the output shaft 6 to establish the third-speed gear train G3. If the third-speed clutch C3 is released and the fourth-speed clutch C4 is applied, the drive gear 23 is connected to the input shaft 5 to establish the fourth-speed gear train G4. Next, if the selector sleeve S is moved to its rightward rear position to effect the connection of only the fourth-speed clutch C4, the driving gear 25 is connected to the input shaft 5 and the driven gear 27 is connected to the output shaft 6 to establish the reverse gear train Gr by which torque is transmitted from the input shaft 5 to the output shaft 6.

The torque thus transmitted to the output shaft 6 is further transmitted from the output gear 28 attached onto the end portion of the output shaft 6, to a large-diameter gear DG of the differential mechanism Df.

In FIG. 2, the hydraulic pump P pumps oil from an oil reservoir R into an oil line 29. This pressurized oil is fed to a manual valve Vm after it has been regulated to a predetermined pressure by the regulator valve Vr. This oil pressure is called a line pressure Pl.

The regulator valve Vr is constructed of a pressure-regulating spring 30 and a spring-receiving sleeve 31 holding the outer end of the spring. This spring-receiving sleeve 31 can be moved to the right or left to increase or decrease the load of the pressure-regulating spring 30. The stator arm 4b abuts against the outer face of the spring-receiving sleeve 31 so that the reaction exerted upon the stator 4, i.e., the stator reaction, is applied to the spring-receiving sleeve 31. A stator spring 32 for bearing the stator reaction is also connected to the spring-receiving sleeve 31 so that if the stator reaction is increased, the stator spring 32 is compressed, moving the spring-receiving sleeve 31 to the left to increase the load of the pressure-regulating spring 30 so that the oil pressure Pl in the oil line 29 is increased.

The oil, whose pressure is regulated by the regulator valve Vr, is partially introduced through an inlet oil line 34 provided with a throttling orifice 33 into the torque converter T to increase the pressure therein to prevent cavitation. This internal pressure is determined by the effective area of the throttling orifice 33, and the strength of a spring 37 of a check valve 36 disposed in an outlet oil line 35 of the torque converter T.

The oil which has passed through the check valve 36 is returned through an oil cooler 56 to the oil reservoir R.

The excess pressurized oil discharged from the hydraulic pump P is introduced from the regulator valve Vr to a lubrication oil line 38 from which it is supplied to the corresponding lubricating portions. In order to ensure the minimum oil pressure required for this, a pressure-regulating valve 39 is connected to the lubrication oil line 38.

The manual valve Vm is interlocked to a gear shift lever (not shown), and is able to be shifted at six positions of a parking position Pk, a reverse position Re, a neutral position N, forward four speed automatic gear shifting position D4, forward three speed automatic gear shifting position D3 except the fourth-speed and second-speed holding position II. The pressurized oil supplied to the manual valve Vm is not further supplied to any of the four clutches C1, C2, C3 and C4, nor to other various hydraulically actuated portions when the valve Vm is at a neutral position N, as shown. Therefore, the four clutches C1, C2, C3 and C4 are all set in the released positions, and the torque of the engine E is not transmitted to the drive wheels W and W'.

When the valve Vm is moved one step to the left from the position shown to the forward four-speed automatic gear shifting position D4, the oil line 29 leading from hydraulic pump P communicates with oil lines 43 and 118, and an oil line 41a provided with a unidirectional throttling device 75 and leading to hydraulic cylinder 40a of the first-speed clutch C1 communicates with the oil line 29 through the oil line 118. Oil line 47 communicates with an oil line 80 while an oil line 81 communicates with an oil line 82 which communicates with hydraulic cylinder 40b of the fourth-speed clutch C4. Further, oil lines 113a and 113 are isolated from an exhaust oil line 114 and an oil line 112, and an oil line 115 sequentially communicates with an exhaust port 116. The oil line 43 leads to a spring chamber 42 of a hydraulic servo motor Sm for moving the selector sleeve S (FIG. 1). As a result, a piston 44 of the servo motor Sm is left in a leftward position, as shown, to hold the selector sleeve S in its forward position shown in FIG. 1 by a shift fork 45 so that the rear gear train Gr is held inoperative.

When the manual valve Vm is moved to the forward three-speed automatic gear shifting position D3, the oil line connection is effected in the same manner that the valve Vm is shifted to the forward four-speed automatic gear shifting position D4 except that an oil line 80 is isolated from an oil line 47. The oil lines 81 and 82 communicate with each other through an annular groove 102 formed on a spool valve member 101 of the valve Vm.

An oil line 46 leading to the input port of a governor valve Vg branches off the oil line 29 leading from the hydraulic pump P. An oil line 47 extends from the output port of the valve Vg. The governor valve Vg is of a known type which is rotated about its axis of rotation 49 by the action of a gear 48 meshing with the large-diameter gear DG of the differential mechanism Df. As a result, centrifugal force is imparted to three weights 51a, 51b and 51c to open the valve which is urged to close by the hydraulic pressure of the oil line 47. In order to produce preferable characteristic, a pair of springs 50a and 50b are provided to urge the valve to open. This governor valve Vg has a rotational speed proportional to the vehicle speed, and it is able to output an oil pressure proportional to the vehicle speed, i.e., a governor pressure Pg in the oil line 47.

From the oil line 43 to which the hydraulic pressure from the pump P is supplied when the manual valve Vm is moved to the forward four-speed and three-speed automatic gear shifting positions D4 and D3, an oil line 53 branches off and is connected to a first throttle valve Vt1 through modulator valve 54 as well as to a second throttle valve Vt2 through an oil line 105.

The modulator valve 54 is a pressure-reducing valve which is constructed so that it is biased by the spring to close and also urged by the modulator pressure of an output port 54a to close to define the upper limit value of the input pressure of the first throttle valve Vt1.

The first throttle valve Vt1 is of a known type and is constructed of a spool valve member 55, a control spring 58 pushing the valve member 55 to the left, a return spring 57 pushing the valve member 55 to the right, a control piston 59 holding the outer end of the control spring 58, a control cam 60 adapted to rotate in response to the increase in the degree of opening of the throttle valve of the engine E to move the control piston 59 to the left, and an adjustment bolt 61 for adjusting the load set by the return spring 57. When the control piston 59 is moved to the left, its displacement pushes the spool valve member 55 to the left through the control spring 58. The oil pressure output to the oil line 52 in accordance with the leftward movement is exerted upon a lefthand shoulder portion 55a of the spool valve member 55 so that the first throttle valve Vt1 can eventually output an oil pressure proportional to the degree of opening of the throttle valve of the engine E, i.e., a throttle pressure Pt1, to the oil line 52. The counterclockwise rotation of the control cam 60 continuously throttles the communication between a drain oil line 117 and the oil reservoir R.

The second throttle valve Vt2 is interposed between an oil line 105 and an oil line 106, and is constructed of a spool valve member 107, a control spring 108 urging the member 107 to the left, a control piston 109 holding the outer end of the oontrol spring 108, and a control cam 110 adapted to rotate in response to the increase in the degree of opening of the throttle valve of the engine E to move the control piston 109 to the left. When the control piston 109 is moved to the left, its displacement pushes the spool valve member 107 to the left through the control spring 108. The oil pressure output to the oil line 106 in accordance with the leftward movement is exerted upon a left shoulder portion 107a of the spool valve member 107 so that the spool valve member 107 is pushed to return to the right. As a result, the second throttle valve Vt2 can eventually output a second throttle pressure Pt2 proportional to the degree of opening of the throttle valve of the engine E, to the oil line 106.

The oil line 52 which introduces the first throttle pressure Pt1 from the first throttle valve Vt1 is connected to the first pilot oil pressure chambers 62a, 62b and 62c of a first-second gear shift valve V1, second-third gear shift valve V2 and third-fourth gear shift valve V3. An oil line 47' which is branched off the oil line 47 and carries the governor pressure Pg from the governor valve Vg is connected to the second pilot oil pressure chambers 63a and 63b of the first-second gear shift valve V1 and second-third gear shift valve V2. Further, when the manual valve Vm is moved to the forward four-speed automatic gear shifting position D4, the oil line 80 which communicates with the oil line 47 through the manual valve Vm is connected to the second pilot oil pressure chamber 63c of the third-fourth gear shift valve V3. As a result, the spool valve members 64a, 64b and 64c of the gear shift valves V1, V2 and V3 are actuated in the following manner when they receive the governor pressure Pg and first throttle pressure Pt1 at either end.

Specifically, the spool valve member 64a of the first-second gear shift valve V1 originally remains at the shown rightward position because of the force of a spring 66, and the oil line 118 is interrupted from the oil line 70. At this time, since the oil line 118 communicates with the oil line 41a, the first-speed clutch C1 is urged and applied. Therefore, the first-speed gear train G1 is established.

When the vehicle speed then increases, which increases the governor pressure Pg so that the leftward force of the governor pressure Pg on the spool valve member 64a overcomes the rightward force of the throttle pressure Pt1 and the spring 66 on the valve member 64a, click balls 68 which move together with the valve member 64a ride over a fixed positioning land 69 in a click motion or snap action mechanism 67 provided at the right-hand end of the valve member 64a, so that the valve member 64a is abruptly switched to a left-hand position. As a result, the oil line 118 communicates with the oil line 70. The oil line 70 is interrupted from the drain oil line 126. If the second-third gear shift valve V2 is moved to the position, as shown, in this state, the oil line 70 communicates with the oil line 81 provided with a unidirectional throttling device 121, and the oil line 81 further communicates with the oil line 82. Since the oil line 82 communicates with the oil line 41b which leads to the hydraulic cylinder 40b of the second-speed clutch C2, the second-speed clutch C2 is urged and applied to establish the second-speed gear train G2.

When the vehicle speed increases further, the second-third gear shift valve V2 moves to the left, so that the oil line 81 communicates with the drain oil line 119, the oil line 70 communicates with the oil line 83, and the oil line 83 is further isolated from the drain oil line 120. As a result, the second-speed clutch C2 is released. On the other hand, if the third-fourth gear shift valve V3 is moved to the position, as shown, the oil line 83 communicates with the oil line 41c provided with unidirectional throttling device 84. This oil line 41c communicates with the hydraulic cylinder 40c of the third-speed clutch C3, so that the third speed clutch C3 is urged and applied to establish the third-speed gear train G3.

If the vehicle speed increases further when the manual valve Vm is held at the forward four-speed automatic gear shifting position D4, the governor pressure Pg is acted to the second pilot oil pressure chamber 63c of the third-fourth gear shift valve V3 through the oil line 80. As a result, the spool valve member 64c is moved to the left, the oil line 41c communicates to the drain oil line 122, so that the third-speed clutch C3 is released. Simultaneously, the oil line 113 provided with a unidirectional throttling device 121 is isolated from the drain oil line 117, and communicated with the oil line 83. The oil line 113 communicates with the oil line 41d through the manual valve Vm, and the oil line 41d communicates with the hydraulic cylinder 40d of the fourth-speed clutch C4. As a result, the fourth-speed clutch C4 is urged and applied to establish the fourth-speed gear train G4.

When the manual valve Vm is moved to the forward three speed automatic gear shifting position D3, the oil line 80 is isolated by the manual valve Vm from the oil line 47. As a result, the force to move the gear valve member 64c is not applied, and the fourth-speed clutch C4 is not applied, so that the fourth-speed gear train G4 is not established.

In order to alleviate the shock at the gear shifting, accumulators 72, 73 and 74 are provided. A first-second speed orifice control valve 124 is provided in the drain oil line 119. A second-third speed orifice control valve 125 is provided in the drain oil line 122.

The spool valve members 64a, 64b and 64c move to the right in sequence of the third-fourth gear shift valve V3, second-third gear shift valve V2 and first-second gear shift valve V1 at deceleration, and again return to the first speed at vehicle stop. When the manual valve Vm is shifted at the second-speed holding position II, the oil line 118 is isolated from the oil line 29 and communicates with the oil reservoir R, the oil line 82 communicates with the oil line 43 through the annular groove 102, only the second-speed clutch C2 is urged and applied to hold the second speed. When the manual valve Vm is shifted at the reverse position Re, the oil line 43 communicates with the oil reservoir R, the oil line 115 is isolated from the exhaust oil line 116 and communicates with the oil line 29, and the left-end chamber of the servo motor Sm is pressurized. As a result, the piston 44 is moved to the right to move the selector sleeve S (FIG. 1) to the right to establish the reverse gear train Gr. Simultaneously, the oil pressure in the oil line 112 increases, so as to be introduced to the oil line 41d through the manual valve Vm. As a result, the fourth-speed clutch C4 is urged and applied, and the vehicle runs reversely.

A control means Dc for controlling the operation of the direct-coupling clutch Cd of the present invention will be further described with reference to FIG. 2. The control means Dc consists of three valves 150, 160 and 170. These three valves 150, 160 and 170 may be connected in series with each other irrespective of the connecting sequence.

The valve 150 is a lockup releasing valve which releases the lockup of the torque converter at the gear shifting time, and is constructed of a spool valve member 151 which can move between a first switching position at the right-hand side and a second switching position at the left-hand side, a first pilot oil pressure chamber 152 facing a left end surface of the valve member 151, a second pilot oil pressure chamber 153a facing the right end surface of the valve member 151, a third pilot oil pressure chamber 153b facing at the stepped part 151a of the valve member 151, and a spring 154 urging the valve member 151 to the right-hand side. The first pilot oil pressure chamber 152 communicates with the oil reservoir R. The oil line 86 which is branched off the oil line 41d leading to the fourth-speed clutch C4 communicates with the second pilot oil pressure chamber 153a. The oil line 87 which is branched off the oil line 41b leading to the second-speed clutch C2 communicates with the third pilot oil pressure chamber 153b. The pressure receiving area of the valve member 151 facing the second pilot oil pressure chamber 153a is substantially equal to that facing the third pilot oil pressure chamber 153b. Two annular grooves 157 and 158 are formed symmetrically to the right and left of a land 156 on the outer periphery of the valve member 151. When the valve member 151 is disposed at the first switching position, as shown, an input oil line 118' which is branched off the oil line 118 as a hydraulic pressure source communicates with the output oil line 161 to the valve 160. This state does not change even when the valve member 151 is disposed at the second switching position at the left-hand side, but the connection of output oil line 161 is temporarily interrupted from the input oil line 118' at the position where the valve member 151 moves between the first switching position and the second switching position, and communicates with the oil line 159 which leads to the oil reservoir R.

The valve 160 is provided between the oil line 161 and an oil line 163, and is constructed of a spool valve member 164 which can move between the closed position at the right-hand side and the open position at the left-hand side, a first pilot oil pressure chamber 165 facing the left end surface of the valve member 164, a second pilot oil pressure chamber 166 facing the right end surface of the valve member 164, and a spring 167 urging the valve member 164 to the open position. An oil line 155 which is branched off the oil line 47' as leading to the governor pressure Pg is connected to the second pilot oil pressure chamber 166. As a result, the governor pressure Pg is introduced to the second pilot pressure chamber 166. The first pilot oil pressure chamber 165 communicates with the oil line 163 through a throttling orifice 168. As a result, the oil pressure which raises the governor pressure Pg in a predetermined amount and increases together with the vehice speed is output to the oil line 163. This oil pressure is introduced to the hydraulic cylinder 14 of the direct-coupling clutch Cd through the valve 170. As a result, the lockup connecting force of the torque converter T is controlled to be weak when the vehicle speed is low and to be stronger as the vehicle speed increases.

Valve 170 is provided between the oil line 163 and an oil line 171 which communicates with the hydraulic cylinder 14 of the direct-coupling clutch Cd, and is constructed of a spool valve member 172 which can move between a closed position at the right-hand side and an open position at the left-hand side, a first pilot oil pressure chamber 173 facing the left end surface of the valve member 172, a second pilot oil pressure chamber 174 facing the right end surface of the valve member 172, and a spring 175 urging the valve member 172 to the closed position. The first pilot oil pressure chamber 173 communicates with the oil reservoir R, and the second pilot oil pressure chamber 174 is connected to the oil line 106 through an oil line 178. In this valve 170, when the pressure of the second pilot oil pressure chamber 174 and hence the second throttle pressure Pt2 is smaller than the force of the spring 175, the valve 170 is closed, as shown, and the hydraulic pressure of the hydraulic cylinder 14 in the direct-coupling clutch Cd is released to the oil reservoir R through the oil line 171 and releasing port 176. When the second throttle pressure Pt2 overcomes the force of the spring 175, the valve member 172 moves to the left, the input oil line 163 communcates with the oil line 171, and the direct-coupling clutch Cd operates. Thus, when the valve 170 is disposed at the idle position in the degree of opening of the throttle valve the direct-coupling clutch Cd is released, and the lockup is released.

The operation of the direct-coupling control system of the embodiment of the present invention will now be described.

Figure 4A:
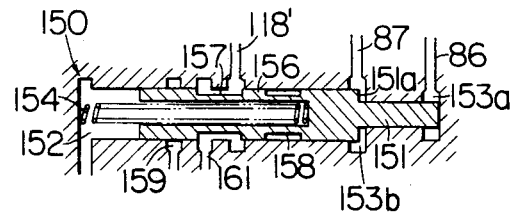
FIGS. 4(a), 4(b), 4(c), and 4(d) are explanatory diagrams of the operation of the valve as a principal portion of the present invention.

If the vehicle is running at the first-speed when the manual valve Vm is disposed at the forward four speed automatic gear shifting position D4, hydraulic pressure is not actuated to the second and third pilot oil pressure chambers 153a and 153b of the valve 150, and the valve 150 is disposed at the first switching position, as shown in FIG. 4(a). As a result, the input oil line 118' communicates with the oil line 161, and the direct-coupling clutch Cd is connected by the connecting force responsive to the vehicle speed.

Figure 4B:
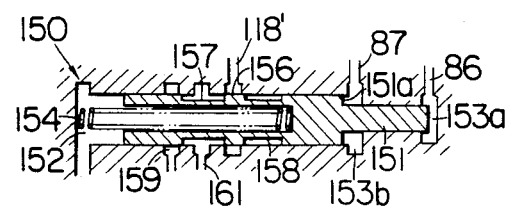
Figure 4C:
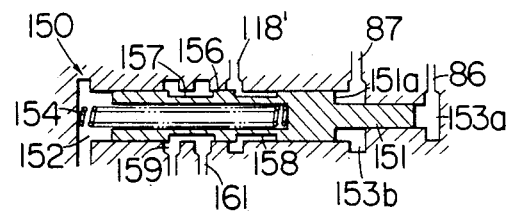

If the vehicle speed is increased, so that the second-speed clutch C2 is connected, the connecting pressure of the second-speed clutch C2 is introduced into the third pilot oil pressure chamber 153b, and the valve member 151 starts moving to the left against the force of the spring 154, as shown in FIG. 4(b). As a result, the input oil line 118' is interrupted by the land 156. When the valve member 151 further moves to the left, the oil line 161 communicates with the oil line 159 through the annular groove 157, as shown in FIG. 4(c), and the input oil line 118' is isolated from the oil line 161 and communicates with the annular groove 158. As a result, the hydraulic pressure supplied through the valves 160 and 170 to the direct-coupling clutch Cd is temporarily released, and the lockup of the torque converter T is temporarily released. As a consequence, the lockup of the torque converter T is released at preferable timing at the speed shifting time from the first gear to the second gear, and the gear shifting shock can be hydraulically absorbed by the torque converter T.

Figure 4D:
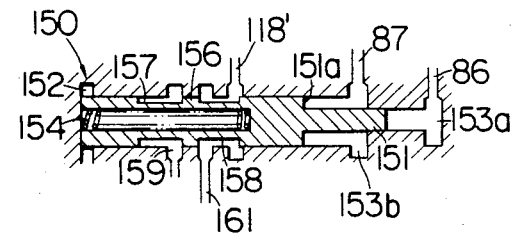

When the valve member 151 moves further to the left, so that it reaches the second switching position, as shown in FIG. 4(d), the input oil line 118' and the oil line 161 again communicate through the annular groove 158. As a result, the torque converter T is again locked up by the connecting force responsive to the vehicle speed.

If the vehicle speed is increased further, so that the second-gear is shifted to the third-gear, the hydraulic oil pressure is not actuated to the second and third pilot oil pressure chambers 153a and 153b of the valve 150. As a result, the valve member 151 moves to the right, as shown in FIGS. 4(d), 4(c), 4(b) and 4(a) and returns from the second switching position to the first switching position. The input oil line 118' is interrupted from the oil line 161 in the course of the returning operation, as shown in FIG. 4(c), and the oil line 161 communicates with the oil line 159 and is released. As a result, the lockup of the torque converter T is temporarily released even at the gear shifting time from the second gear to the third gear.

If the vehicle speed is increased further, so that the third speed is shifted to the fourth speed, the connecting pressure of the fourth-speed clutch C4 is actuated to the second pilot oil pressure chamber 153a. As a result, the valve member 151 is moved to the left in the same manner as the shifting time from the first gear to the second gear, and the lockup of the torque converter T is released temporarily in the course of movement.

If the vehicle speed is decreased, so that the fourth speed is sequentially shifted down, the valve member 151 moves oppositely to the above-described operation. In any case, the valve member 151 of the valve 150 moves between the first switching position and the second switching position at the gear shifting time, the input oil line 118' and the oil line 161 are interrupted temporarily in the course of the movements, and the oil line 161 is released to the oil reservoir R. As a result, the lockup of the torque converter T is temporarily released at the gear shifting time.

In the embodiment described above, the forward four-speed automatic transmission has been described. However, it is evident that the present invention can be applied up to five-speed automatic transmission without any modification. When the present invention is applied to forward six- or seven-speed automatic transmission, another stepped part, to which the connecting pressure of the sixth-speed clutch is actuated, is provided toward the second switching position side at the valve member 151 of the valve 150, and substantially equal pressure receiving areas are provided at the respective pressure receiving parts. Some multiple-speed automatic transmissions are constructed such that lock up of the torque converter is not effected at the first gear. In this case, the connecting pressure of the odd-number clutch is actuated to the respective pressure receiving parts of the valve 150, and as an input oil line is selected an oil line which is branched off an oil line such as the oil line 70 serving as a hydraulic oil pressure source commonly used for introducing the pressure into the clutches above the second-speed.

In summary, the valve 150 has a plurality of pressure receiving parts which are urged to the second switching position and the clutch connecting pressure may be actuated at every other step to the pressure receiving parts.

Figure 5:
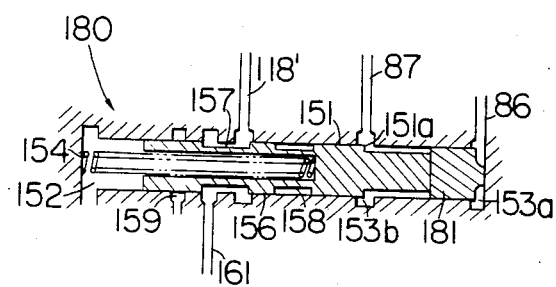
FIGS. 5 and 6 are diagrams showing the valve structures as principal portions of second and third embodiments of the present invention.

FIG. 5 shows a second embodiment of the present invention. In this embodiment, a valve 180 is used instead of the valve 150. In the valve 180, a plunger 181 separate from the valve member 151 is disposed in front of and in contact with the right end surface of the valve member 151. As a result, the pressure receiving area of the stepped part 151a and the pressure receiving area of the plunger 181 can be significantly increased. Consequently, it is effective when the valve 180 has sufficient space in a longitudinal direction. In the embodiments of FIG. 5, valves 180 and 150 are combined. Installation space can be reduced. Manufacturing cost is decreased. Because the possibility of leakage losses increase with the number of the valves possibilty of leakage is reduced.

Figure 6:
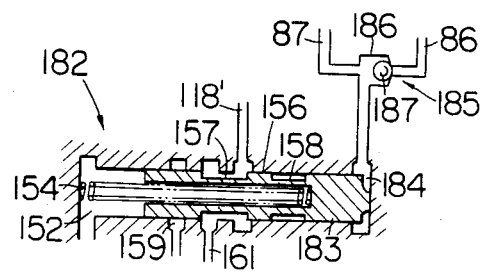

FIG. 6 shows a third embodiment of the present invention. In a valve 182, a stepped part is not formed at the valve member 183, and the connecting pressure of the second-speed clutch C2 or the connecting pressure of the fourth-speed clutch C4 is selectively introduced to the second pilot oil pressure chamber 184 through a high-selection valve means 185. The high selection valve means 185 is known to be constructed by containing a sole steel ball 187 in a casing 186 in such a manner that the containing space is extremely small and that the oil sealing performance is excellent. The purpose of the present invention can be carried out merely by adding such small parts as the high-selection valve means 185.

In the embodiments described above, the present invention has been described with reference to the variable power dividing torque converter. However, it is apparent that the present invention can be executed in the direct-coupling control system for a torque converter of the type which does not allow slip at the operating time.

According to the present invention described above, the control means comprises a valve having first and second switching positions for opening the oil line to connect a hydraulic oil pressure source and a direct-coupling clutch and closing the oil line temporarily at the switching time between the first and second switching positions, and the valve is constructed to alternately switch between the first and the second switching positions whenever the speed shifting operation is shifted by one step. As a result, even in an automatic transmission provided with not less than four-speeds, the lockup of the torque converter can be released at the gear shifting in a structure by adding a sole valve or small number of parts to the valve, the installing space can be thus reduced, and the restriction in the manufacturing of the transmission can be decreased.

It is readily apparent that the the above-described direct coupling clutch controller meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In an automatic transmission for a vehicle, comprising a fluid torque converter having an input member and an output member; and an auxiliary transmission having a plurality of stages of gear trains selectively connected to the output member of said torque converter and having frictionally engaging elements engageable upon receipt of hydraulic pressure fed through hydraulic fluid passages;
   a direct-coupling clutch and control system for the torque converter, which comprises:
   a direct-coupling clutch interposed between the input and output members for mechanically coupling said members together; and a hydraulic pressure source and said direct-coupling clutch for controlling engagement of said clutch.
   wherein said control means comprises an oil line, a valve in said oil line having first and second switching positions on opposite ends of the valve for opening said oil line and for temporarily releasing the pressure fed to the direct-coupling clutch at the time of shifting of the valve between the first and second switching positions, said valve being normally urged by a resilient means toward the first position and being urged toward the second position against a force of the resilient means when said valve receives, on a pressure receiving portion of the valve, a part of the hydraulic pressure being fed to said auxiliary transmission for engagement of the gear trains from one gear train stage of said gear train stages to another gear train stage of said gear train stages of said plurality of gear train stages, which part of pressure is fed through oil lines branched off the oil lines feeding hydraulic fluid for engagment of said another gear train stage.

2. The direct-coupling control systems as set forth in claim 1, wherein said valve is a spool valve including a spool valve member, said pressure receiving portion being formed of a plurality of steps dividing said spool valve member into sectional areas.

3. The direct-coupling control system as set forth in claim 1, wherein said oil lines branched off the oil lines feeding hydraulic fluid for the gear train stages of said plurality of gear train stages are associated with said pressure receiving portion of the value through high-selection value means.

4. The direct-coupling control system as set forth in claim 1, wherein said valve is a spool valve including a spool valve member and a plunger separate from and in contact with said spool valve member, said pressure receiving parts arranged on said valve member and said plunger.

* * * * *